| United States Patent [19] | [11] | 4,026,967 |
|---|---|---|
| Flexman, Jr. et al. | [45] | May 31, 1977 |

[54] PROCESS FOR MAKING GRAFTED POLYMERIC MATERIAL

[75] Inventors: Edmund Arthur Flexman, Jr.; Frank Clyde Starr, Jr., both of Wilmington, Del.

[73] Assignee: E. I. Du Pont de Nemours and Company, Wilmington, Del.

[22] Filed: June 25, 1976

[21] Appl. No.: 699,932

[52] U.S. Cl. .................................... 260/878 R
[51] Int. Cl.$^2$ ............. C08F 255/02; C08F 255/04; C08F 255/06
[58] Field of Search ................................ 260/878 R

[56] References Cited

UNITED STATES PATENTS

| 2,811,514 | 10/1957 | Hagemeyer, Jr. | 260/94.9 |
|---|---|---|---|
| 2,973,344 | 2/1961 | Fasce | 260/78.4 |
| 3,231,498 | 1/1966 | de Vries | 252/56 |
| 3,236,917 | 2/1966 | Natta et al. | 260/878 |
| 3,286,992 | 11/1966 | Armeniades et al. | 259/4 |
| 3,342,771 | 9/1967 | Cheritat et al. | 260/41 |
| 3,481,910 | 12/1969 | Brunson | 260/78.4 |
| 3,484,403 | 12/1969 | Brunson | 260/23 |
| 3,642,722 | 2/1972 | Knowles et al. | 260/78.4 D |
| 3,664,638 | 5/1972 | Grout et al. | 259/4 |
| 3,704,006 | 11/1972 | Grout et al. | 259/4 |
| 3,804,926 | 4/1974 | Schwarz et al. | 260/897 A |
| 3,862,265 | 1/1975 | Steinkamp et al. | 260/878 R |
| 3,873,643 | 3/1975 | Wu et al. | 260/878 R |
| 3,876,729 | 4/1975 | Mueller | 260/878 R |
| 3,884,882 | 5/1975 | Caywood, Jr. et al. | 260/78.4 D |
| 3,953,655 | 4/1976 | Steinkamp et al. | 428/474 |

OTHER PUBLICATIONS

Schott et al., "Motionless Mixers in Plastic Processing", Chemical Engineering Progress, vol. 71, No. 1, pp. 54–58, (Jan., 1975).

Literature published by Kenic Corp., "KTEK-12345678 Radial Mixing and Residence Time Distribution in the Static Mixer Unit", July, 1972.

*Primary Examiner*—Alan Holler

[57] ABSTRACT

A continuous process is disclosed for manufacturing a grafted polymeric material of improved quality. The process is conducted in baffled tubular reactors which exhibit dispersed plug-flow character and which provide: rapid heating and cooling of reactants; short reaction time with uniform material residence time; and radial uniformity of temperature.

12 Claims, No Drawings

PROCESS FOR MAKING GRAFTED POLYMERIC MATERIAL

BACKGROUND OF THE INVENTION

1. Field of the Invention

Polymeric materials have found widespread use in the manufacture of innumerable articles. There is a constant need for additional polymeric materials having new qualities or old qualities at reduced expense. This invention relates to a process for providing additional polymeric materials by means of a grafting reaction. The invention more specifically pertains to a polymeric grafting reaction wherein the reaction is conducted in an internally baffled tube, under conditions which prevent excessive degradation of the initial polymeric backbone structure, and in the absence of free radical initiators.

2. Description of the Prior Art

Grafting reactions, in a general way, are well known. A process for graft reaction of alpha-olefins using derivatives of unsaturated carboxylic anhydrides is disclosed in U.S. Pat. No. 3,236,917, issued Feb. 22, 1966 on the application of Natta et al. That patent discloses grafting in a roll mill or in solution, always in the presence of a free radical initiator.

U.S. Pat. No. 3,862,265, issued Jan. 21, 1975 on the application of Steinkemp et al., discloses a grafting reaction process in a screw-fed extruder device. The process includes working a polymeric material in the extruder to degrade it prior to introducing graft material. The materials are mixed and moved entirely by the action of the screw feed and the reaction is conducted in the presence of a free radical initiator.

U.S. Pat. No. 3,873,643, issued Mar. 25, 1975 on the application of Wu et al., discloses a polymeric material having grafted cyclic or polycyclic acids and anhydrides. The backbond polymers are polyolefins and the grafting reaction is conducted in heated extruders or roll mills.

U.S. Pat. No. 3,884,882, issued May 20, 1975 on the application of Caywood, discloses the preparation of adducts of maleic anhydride grafted onto a polyolefin backbone polymer. The grafting reaction is conducted in extruders or roll mills at temperatures of from 225° to 350° C.

SUMMARY OF THE INVENTION

In previously used processes for modifying the characteristics of a polymeric material by means of grafting reactions, it has often been the case that the backbone polymer is excessively degraded during the reaction, or that reaction conditions are such that the graft monomer causes crosslinking in the grafted polymeric material product. Previously used processes also often resulted in a broad distribution of molecular weights of grafted polymeric material due to uneven heating or incomplete mixing of the reacting components, or due to heating and cooling cycles which were too time-consuming for optimum grafted polymeric material production. Previously used processes often exhibit a low conversion of graft monomer to grafted polymeric material.

It is an object of this invention to provide a process for manufacturing a grafted polymeric material wherein there is a low degree of crosslinking and a low degree of undesired polymer degradation. It is further an object of this invention to provide such a process wherein the graft reacting components are combined and the combination is heated to grafting temperature uniformly and rapidly.

It is a specific object of this invention to provide a process for manufacturing grafted polymeric material using an internally baffled tubular reactor exhibiting: rapid and substantially complete dispersion of contained reactants; rapid and uniform temperature change of contained materials parallel to the axis of material flow in the reactor; and small temperature gradient perpendicular to the axis of material flow in the reactor.

The grafting reaction involves a backbone polymer and a graft monomer to yield a grafted polymeric material. The grafting reaction is conducted without the addition of free radical generating additives. Temperatures of reaction are as low as can be used to maintain a short reaction time and as high as can be tolerated to avoid excessive degradation of the backbone polymer. Use of the internally baffled tubular reactor with high efficiency of mixing and the attendant uniformity of temperatures across contained materials permit the use of short grafting reaction times at relatively high temperatures without a fear of hot spots in grafting reaction medium. Such hot spots and uneven radial temperature distribution in grafting reaction vessels result in degradation of the backbone polymer and otherwise unacceptable or undesirable grafted polymeric material. Where residence time of contained materials can be maintained practically constant and where temperature gradients perpendicular to the axis of flow can be maintained very low, it has been found advantageous to conduct the grafting reaction at high temperatures with short time rather than at low temperatures with longer time.

Polymeric materials eligible for use as backbone polymer in practice of this invention include thermoplastic and elastomeric compounds capable of accepting a graft. Preferred thermoplastic and elastomeric compounds are polymers of ethylene and copolymers derived from ethylene and $C_3$–$C_8$ alpha-olefins and especially $C_3$–$C_5$ alpha-olefins, including copolymers of at least one olefin with other monomers. The eligible backbone polymer materials fall, generally, into two categories. First, there are backbone polymers which are substantially saturated and which include polymers of ethylene and copolymers derived from ethylene and alpha-olefins. Second, there are backbone polymers which have a substantially saturated backbone chain, unsaturated side-chains, and which include copolymers derived from ethylene and alpha-olefins. The term alpha-olefin includes monoolefins and diolefins and does not include ethylene.

Backbone polymer materials of the first category exhibit a major difference from materials of the second category in grafting reaction requirements. The saturated backbone polymers of the first category are subjected to a thermal cracking in order to achieve a graft. The cracking is accompanied by the grafting reaction and, through use of the present process, excessive backbone polymer degradation is maintained at a low level. Examples of backbone polymer in this category are high density and low density polyethylene and copolymers derived from ethylene and at least one of the following: propylene; methyl and ethyl acrylate; methyl methacrylate; acrylic and methacrylic acid; carbon monoxide; and the like.

The backbone polymers having a substantially saturated backbone chain and unsaturated side-chains experience the grafting reaction primarily at the side-chain sites of unsaturation. Whatever small amount of unsaturation might exist in the backbone chain may take part in the grafting, but such is not believed to be an important factor in the reaction. Grafting on the side-chains occurs at a temperature somewhat lower than grafting by thermal cracking and, for that reason, can be conducted without appreciable thermal degradation or grafting onto degraded backbone polymer, if adequate controls are present for reaction conditions. The uniform residence time, temperature control, and low radial temperature gradients of the process of this invention make this process admirably suited for grafting onto unsaturated side-chains with a low degree of thermal degradation. Examples of backbone polymer in the second category of materials are copolymers of olefins with a diolefin such as a copolymer of ethylene with a diene. Additional examples of backbone polymer in this second category include copolymers of ethylene or of ethylene and other olefins, such as propylene with: linear aliphatic nonconjugated dienes of at least six carbon atoms, such as 1,4-hexadiene; other dienes, conjugated or not, such as norbornadiene, dicyclopentadiene, ethylidene norbornene, and butadiene; and the like. A specific example of such a backbone polymer is a copolymer of ethylene, propylene, 1,4-hexadiene, and norbornadiene.

Graft monomers eligible for use in practice of this invention include unsaturated carboxylic anhydrides and dianhydrides thermally stable at the temperature of the grafting reaction. Examples of eligible graft monomers are: methacrylic acid; acrylic acid; glycidyl methacrylate; 2-hydroxy ethylacrylate; 2-hydroxy ethyl methacrylate; diethyl maleate, monoethyl maleate; di-n-butyl maleate; maleic anhydride; maleic acid; fumaric acid; itaconic acid; dodecenyl succinic anhydride; 5-norbornene-2,3-anhydride; nadic anhydride (3,6-endomethylene-1,2,3,6-tetrahydrophthalic anhydride); and the like.

In any grafting reaction of this invention, the backbone polymer can be a combination of more than one kind of backbone polymer and the graft monomer can be a combination of more than one kind of graft monomer.

Important factors for successfully accomplishing the grafting reaction include close overall control of the temperature of reactant materials and maintenance of a short and uniform residence time of materials in the reactor. If there are large temperature differences within the reactant melt, there will be inconsistent degrees of reaction -- incomplete grafting in low temperature zones and polymer degradation in high temperature zones. In a tubular or extruder reactor, the temperature differences perpendicular to gross material flow (radially) must be minimized. To minimize such temperature differences, there must be efficient radial dispersion of materials in order that heat transfer will occur from one location in the reactor, radially, to another. Axial temperature control is also important to prevent inconsistent degrees of reaction which might arise from varying exposure to proper temperatures of reaction. A steady state operation is necessary for conducting acceptable continuous grafting reaction processes. To achieve a grafted polymer of unifrom quality, it is important that all of the reactant material be exposed to substantially the same reaction temperatures for substantially the same time.

A reactor which exhibits the required temperature control, efficiency in heat transfer, and uniformity of residence time, is a tubular reactor internally fitted with a series of helix baffles of alternating opposite pitch. Such a reactor is disclosed in U.S. Pat. No. 3,286,992, issued Nov. 22, 1966 on the application of Armeniades et al. Specific characteristics of an eligible baffled tubular reactor are described with reference to an unbaffled tube through which the same grafting reactant materials are flowing with the same initial temperature.

Heat transfer comparisons in chemical reactors can be made by means of a well-known dimensionless engineering parameter — the Nusselt Number (Nu). When $h$ is the film coefficient of heat transfer, $D$ is a characteristic dimension in the reactor (such as internal diameter), and $k$ is the thermal conductivity of the fluid, then $$Nu = (hD/k).$$

In a comparison of baffled and unbaffled tubular reactors, the $D$ and the $K$ remain the same and it is found that the eligible baffled tubular reactor exhibits a Nusselt Number and, therefore, a heat transfer, of at least 2 to 2½ times that of the unbaffled tube.

Another indication of the completeness of mixing in the baffled reactor used in the process of this invention is a comparison of radial temperature gradients in a heated section of the reactor. Unbaffled tubular reactors may exhibit as much as a 60° C. difference between the heated boundary layer at 350° C. and the center of the reactor (radial temperature gradient). On the other hand, an eligible baffled reactor exhibits a radial temperature gradient of only about 6 to 9, and, in any event, less than 10° C. An eligible baffled tubular reactor exhibits a radial temperature gradient of less than about 15 percent of the gradient in an unbaffled reactor under the same conditions.

The degree of axial mixing or dispersion in an eligible tubular reactor can be estimated by a dimensionless engineering parameter known as the Peclet Number (Pe). When $v$ is an average linear flow velocity in a reactor, L is a characteristic length of the reactor, and E is a dispersion coefficient determined in the axial direction, then $$Pe = vL/E.$$

In an eligible tubular reactor, the flow of material can be described as "dispersed plug flow." Such dispersed plug flow provides that each element of material is in the reactor for substantially the same time and that there is considerable movement of domains of the material with respect to other domains of the material in a radial direction, rather than in an axial or longitudinal direction. When a system exhibits dispersed plug flow, E, the axial dispersion coefficient is very low — ideal dispersed plug flow yields an E equal to zero and a Peclet Number of infinity. In a system with high axial dispersion (back-mixing) and little radial mixing, E is very high — ideal backmixing yields an E equal to infinity and a Peclet Number of zero. For practical purposes, a Peclet Number of 100 is said to identify dispersed plug flow and an eligible baffled tubular reactor exhibits a Peclet Number of at least 100. In general, any tubular reactor having a Peclet Number of at least 100 exhibits the required low radial temperature gradient, has dispersed plug flow character, and is an eligible reactor.

In practice of the present process, the reactant components are combined and heated rapidly to a uniform reaction temperature; and after the grafting reaction the temperature is rapidly and uniformly reduced. While, as a general rule, the whole of the heating and cooling steps should be conducted rapidly, the portion of those steps wherein chemical reaction can occur is the portion which is considered to be critical. The heating of reactant components from about 300° C. to the grafting temperature should be accomplished in less than 2 minutes and preferably less than 1 minute; and the cooling of grafted polymeric material from the grafting temperature to about 300° C. should be accomplished in less than 3 minutes and preferably less than 1 minute. The rate of temperature change for heating and cooling steps should be at least about 1 and preferably 2° C. per second. The reactant components are intimately mixed and each element of material experiences practically the same reaction temperature for practically the same duration. The duration of reaction is generally less than about ten minutes and more than about one-quarter minute. The most preferred duration is from about five minutes to about one-half minute — the shorter maximum time being important to prevent excessive degradation, crosslinking, and other undesirable side reactions.

The eligible range of grafting reaction temperature is from about 275° to about 550° C. and preferably from about 350° to about 500° C. It has been found that close temperature control, small radial temperature gradients, and uniform, short residence time permit high grafting temperatures to be used without the excessive backbone degradation and crosslinking which would be expected at the high temperature. For backbone polymer of the substantially saturated, first category, wherein a thermal cracking is required for grafting, the process of this invention is conducted at a temperature of about 350° to 550° C., preferably about 400° to 500° C. For backbone polymer of the second category having unsaturation in the sidechains, grafting is accomplished, in accordance with this invention, at a temperature of about 275° to 450° C. preferably about 350° to 450° C.

In a general way, the process of the present invention includes combining a backbone polymer and a graft monomer and then introducing the combination into a tubular reactor which exhibits dispersed plug flow. The combination is rapidly heated to reaction temperature and the combination, now a molten mixture, is conducted through the reactor to accomplish the grafting reaction. On completion of the grafting reaction, the grafted polymeric material is rapidly cooled to less than about 300° C. It should be understood that the present process contemplates introducing into the reactor a combination of backbone polymer and graft monomer which has already been heated. The order of heating the material and introducing it into the reactor can be interchanged within the scope of the present process.

It is generally desired or required to form a grafted polymeric material having from about 0.01 to about 20, preferably about 0.1 to about 10, and most preferably about 0.2 to about 5, weight percent graft monomer. An excess of graft monomer in the reactant mixture and a backbone polymer having unsaturation in an excess of that required for the desired degree of grafting, are helpful. As a general rule, and assuming adequate unsaturation, 50 percent of the graft monomer, and sometimes more can be successfully grafted with the backbone polymer.

The grafting reaction of this process is conducted without the use of accelerators, catalysts or other free-radical generating additives; and, for that reason, produces a reduced amount of degraded backbone polymer. The reaction of this invention, with uniform temperatures, uniform residence time, and rapid temperature changes, accomplishes grafting reactions without the need for free-radical generating additives. Thus, polymer degradation is reduced both by eliminating uneven temperature extremes and by omitting chain-breaking additives.

DESCRIPTON OF PREFERRED EMBODIMENTS

In the following examples, backbone polymer and graft monomer are combined prior to introduction into the baffled reactor and the combination is fed through the reactor by means of force provided by a screw extruder. As an example of an eligible internally-baffled tubular reactor exhibiting dispersed plug flow and the other required parameters, the reactor most often used in the following examples is a Static Mixer (trademark) having an inner diameter of about 3.8 centimeters (1½ inches) and sold by the Kenics Corporation, Danvers, Mass., U.S.A. It is to be understood that the reactor discussed herein is not required to include the entire length of an internally baffled vessel. The reactor portion of the baffled vessel is that portion which is maintained at a temperature adequate to accomplish at least about 80 percent of the total grafting reaction. Unless otherwise indicated, temperatures are in centigrade units and percentages are by weight. The reactor is a closed system and all grafting reactions are conducted in the absence of free-radical generating additives.

Melt index, referred to herein, is generally measured according to a test of the ASTM (D-1238-70). In that test, the rate of extrusion in grams per 10 minutes (through an orifice 0.0825 inch [0.210 cm] in diameter and 0.315 inch [0.800 cm] in length) is determined for the material under test at 190° and under the force of a piston having a diameter of 0.373 inch (0.947 cm) and a total weight of 2,160 grams.

EXAMPLE 1

In this example, fumaric acid is the graft monomer and linear, high density, polyethylene homopolymer (0.958 g/cm$^3$) is the backbone polymer. The backbone polymer exhibits a melt index of about 3.

The backbone polymer, in cube form, and granules of the graft monomer are mixed together and introduced into the reactor at a temperature of about 330°. The mixture is about two percent graft monomer. The temperature is increased to about 420° in about one minute and this temperature is maintained for about 2.5 minutes during which time the reacting mixture advances through about 45 centimeters (about 1½ feet) of the reactor. The total length of the vessel is about 75 centimeters and the total vessel residence time is about 4.0 minutes. The grafted polymeric material is then cooled to below about 270° and expelled from the reactor.

The melt index for the grafted polymeric material is about 10 to 20 and the percent of grafting is found to be about 0.6. The pressure drop across the reactor is found to be about 7 kg/cm² (100 pounds/inch²).

Substantially the same results are produced when another eligible graft monomer, such as maleic acid or maleic anhydride, is substituted for the fumaric acid of this example. Other polyethylene backbone polymers can be substituted for the polyethylene of this example. Alternatively, the mixture of backbone polymer and graft monomer can be heated to reaction temperature before introduction into the reactor.

EXAMPLE 2

In this example, the monoethyl ester of maleic anhydride (MAME) is the grafted monomer and a copolymer of ethylene, propylene and 1,4-hexadiene is the backbone polymer. The backbone polymer is primarily a material of saturated backbone and unsaturated side-chains, it being about 71 percent ethylene, about 25 percent propylene, and about 4 percent diene. The backbone polymer exhibits a melt index of about 0.1, using a melt index testing temperature of 280°.

Cubed backbone polymer and about one percent graft monomer are mixed prior to introduction into the reactor. The mixture is heated to about 350°, as in the previous example. The temperature is maintained for about 5.7 to 6.0 minutes to complete the grafting and the grafted polymeric material is cooled to less than 300 degrees and expelled from the reactor. When the reaction temperature is low, the residence time must be increased accordingly to achieve the desired result. A higher reaction temperature permits a shorter reaction time.

The melt index (using 280° as the testing temperature) is about 5 to 10 and the percent of grafting is found to be about 1.0. The pressure drop across the reactor is found to be about 20 to 50 kg/cm² (300 to 700 pounds/in²).

Substantially, the same results are produced when other backbone polymers are used which have unsaturated side-chains. Other backbone polymers include copolymer derived form ethylene, propylene, 1,4-hexadiene, and norbornadiene, for example, in a weight ratio of about 70/23/6.75/0.25, respectively. Other graft monnomers can be substituted for the MAME of this example. Fumaric acid, maleic acid and anhydride, methacrylic acid, glycidyl methacrylate, and the like, can all be expected to yield similar results. Of course, different concentrates of graft monomer will produce grafted polymeric material having different graft content.

EXAMPLE 3

This example provides an indication of the desirability of short residence times and rapid mixing and temperature changes as related to the degradation of backbone polymer during the grafting.

The backbone polymer and graft monomer are the same as are used in Example 2 and the reactor and procedure are those of Example 1. Three graft reactions are conducted, each at a different rate of flow through the reactor, with all other conditions remaining the same. The amount of MAME used is one to two percent and the reaction temperature is 380° to 385°. The melt index testing temperature is 280 degrees. Grafted polymeric material is produced as follows:

| Material Flow (Grams/Minute) | Approximate Residence Time (Minutes) | Melt Index |
|---|---|---|
| 188 | 4.8 | 52 |
| 244 | 3.7 | 16.3 |
| 292 | 3.1 | 6.8 |

EXAMPLE 4

This example utilizes the backbone polymer of Example 2 and fumaric acid graft monomer, each in pellet or powder form, and homogeneously mixed with a three percent fumaric acid content. The reaction temperature is 365° to 370° and the reaction duration is about 3.1 to 3.4 minutes.

The grafted polymeric material is found to contain about 1.5 to 1.6 percent fumaric graft calculated as anhydride. The melt index of the grafted polymeric material is about three using a testing temperature of 280°.

When any of the above examples are repeated using an eligible baffled reactor of larger size or higher capacity, substantially the same results are achieved. For instance, when the reaction of this Example 4 is repeated using an eligible reactor having an inner diameter of about 5 centimeters, the following data is generated: (i) using a mixture with about 4 percent fumaric acid content, a temperature of about 400°, and a reaction duration of about 3.5 to 4.5 minutes, about 1.75 percent graft is achieved with a melt index (determined at 280 degrees) of about 2.5; (ii) using a mixture with about 8 percent fumaric acid content, a temperature of about 365° to 370°, and a reaction duration of about 8 to 8.5 minutes, about 3.5 graft is achieved with a melt index (determined at 280°) of about 15.6.

EXAMPLE 5

This example demonstrates a variation on the combination of reacting components and introduction of the components into the reacting conditions. Fumaric acid is the graft monomer and high density polyethylene having a melt index of about 3 is the backbone polymer. Polyethylene backbone polymer and about 4 percent fumaric acid are melt blended below the graft reaction temperature; and then the melt blend is combined on an even weight basis with additional polyethylene backbone polymer. The resulting melt combination is introduced into a reactor as used above, having about a 5-centimeter inner diameter. The reaction temperature is about 400° to 440° and the reaction duration is about 5.2 minutes. About 0.9 percent graft is found in the grafted polymeric material and the melt index is about 15.5.

The grafted polymeric material of this invention finds important use alone or in combination with other polymeric materials, as a elastomeric material of construction for structural parts such as in machinery requiring gears or bushings of particular slip or friction character. The graft reaction of this invention is used to modify the character of backbone polymer and the grafted polymeric material is used to provide improved qualities to structural polymers already used for a variety of purposes.

What is claimed is:

1. A process for making grafted polymeric material comprising the steps of:

a. mixing a backbone polymer and a graft monomer;
b. introducing the mixture into a tubular reactor device exhibiting dispersed plug-flow character;
c. raising the temperature of the mixture to from 275° to 550° centigrade;
d. conducting the mixture through the tubular reactor in a time adequate to accomplish a grafting reaction and less than necessary for excessive degradation, maintaining the temperature of step (c) for from ten to one-quarter minutes to yield grafted polymeric material.

2. The process of claim 1 wherein the temperature of the grafted polymeric material is reduced from the temperature of step (c) to less than 300° C. in less than 3 minutes.

3. The process of claim 1 wherein the temperature of step (c) is maintained for less than about 5 minutes.

4. The process of claim 1 wherein the backbone polymer is selected from the group consisting of thermoplastic and elastomeric polymers of ethylene and copolymers derived from ethylene and $C_3$–$C_8$ alpha-olefins.

5. The process of claim 4 wherein the backbone polymer is substantially saturated.

6. The process of claim 5 wherein the backbone polymer is high density polyethylene.

7. The process of claim 4 wherein the backbone polymer has a substantially saturated backbone chain and unsaturated side-chains.

8. The process of claim 7 wherein the backbone polymer is a copolymer of ethylene and at least one $C_3$–$C_8$ alpha-olefin.

9. The process of claim 8 wherein the backbone polymer is a copolymer of ethylene, propylene, 1,4-hexadiene, and norbornadiene.

10. A process for making a grafted polymeric material by reacting a backbone polymer with a graft monomer wherein the improvement comprises conducting the reaction in a tubular reactor device exhibiting dispersed plug-flow character.

11. A process for making a grafted polymeric material by reacting a graft monomer with a backbone polymer wherein the improvement comprises conducting the reaction at a temperature of from 275° to 550° C. for a duration of from about 10 minutes to ¼ minute in a tubular reactor device exhibiting dispersed plug-flow character, a radial temperature difference of less than 10°, and a Peclet Number of greater than 100.

12. The process of claim 11 wherein the reaction temperature is from 350° to 500° C. and the duration of the reaction is from about ½ minute to about five minutes.

* * * * *